UNITED STATES PATENT OFFICE.

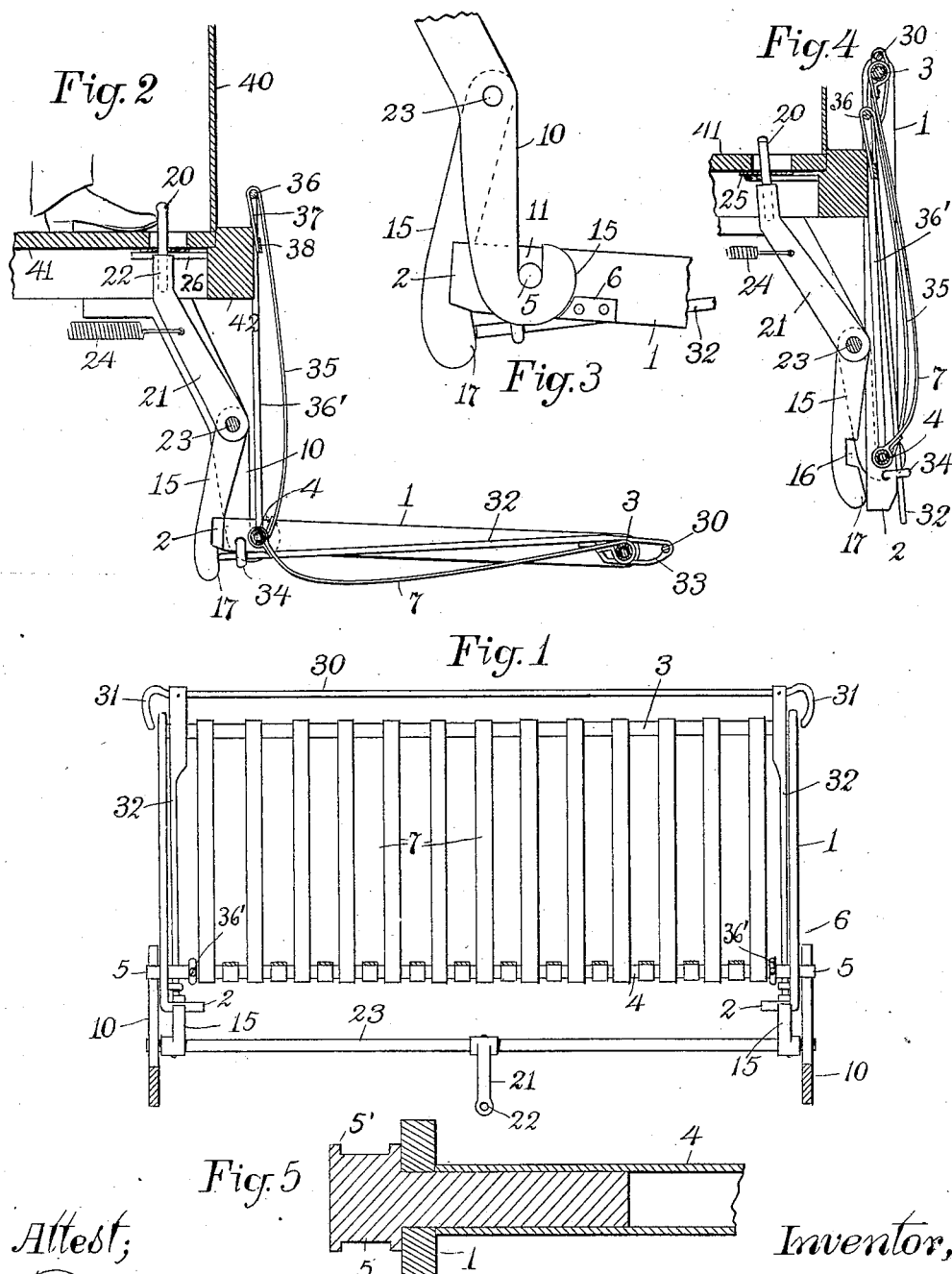

LOWELL MASON MAXHAM, OF BOSTON, MASSACHUSETTS, ASSIGNOR OF ONE-HALF TO ISAAC W. CROZIER, OF BOSTON, MASSACHUSETTS.

CAR FENDER AND GUARD.

No. 863,198.           Specification of Letters Patent.           Patented Aug. 13, 1907.

Application filed November 16, 1904. Serial No. 232,913.

*To all whom it may concern:*

Be it known that I, LOWELL MASON MAXHAM, a citizen of the United States, and a resident of Boston, in the county of Suffolk, State of Massachusetts, have invented certain new and useful Improvements in Car Fenders and Guards, of which the following is a full, clear, and exact description.

The object of this invention is the construction of an improved fender and guard by means of which a person standing or lying upon the tracks in front of an approaching street car may be picked up and guarded from injury.

Referring to the drawings forming part of this specification, Figure 1 is a plan view of the fender embodying my invention, the guard being represented as broken away therefrom. Fig. 2 is a side sectional elevation of the fender and guard, and of a portion of the street car carrying the same. Fig. 3 is a side view of a part of the fender-frame and its supporting devices. Fig. 4 is a side sectional view similar to that in Fig. 2, but showing the fender as housed up against the car front. Fig. 5 is a sectional detail view of one of the trunnions or pivots by which the fender is supported.

In the drawings, 41 represents a part of a car platform; 40, the dashboard, and 42 the buffer. The fender supports 10 are fastenened to the under sides of said platform, to the side-sills thereof, and project downward and slightly forward therefrom. Each support 10 is formed with an upturned hook thereby providing a deep notch or slot 11, while the outer edge of such hook 15 is given a curve substantially concentric with the lower extremity of said notch or slot. Into said slots or notches are placed the trunnions 5 projecting from the side-rails 1 of my fender, as shown in Figs. 1 and 3; the fender being supported in a substantially level manner by the engagement of its rearward extensions 2 with the notches 16 (Fig. 4) in the pivoted arms 15. By swinging said arms backward, said extensions are deprived of the support of said arms, and the fender has its front end immediately dropped to the track. For the operation of said arms, they are made rigid with the shaft 23 whose ends are supported in bearings in the supports or brackets 10, and from which shaft rises an arm 21 into the control of the motorman. A strong spring 24 suitably anchored and attached to said arm 21 retains the arms 15 in normal control of the fender.

To retain the fender in its housed position up against the car-end, the ends 17 of the arms 15 are arranged to be strongly pressed against the extensions 2 as shown in Fig. 4, and by such pressure below the pivotal supports of the fender to either partially or wholly hold it back against the buffer 42.

To keep the fender-trunnions 5 from rising up and out from the slots 11, except when the fender is in a substantially vertical position, the blocks 6 are fixed to the side-bars 1 in such a manner as to reach below the curve of the hooks 15, as shown in Fig. 3. When the fender is turned up into a more or less vertical position, said blocks are brought above said curves and the fender can therefore be raised until the trunnions are free from the slots and the fender can then be bodily removed. This is done when but a single fender is used for a car; the same being transferred from end to end of the latter as desired. Without said blocks 6, the fender might have its front edge ride up over an obstruction should for any reason the motorman neglect to drop it to the track.

By forming the arm 21 with a socket 22 into which a pin 20 is removably applied, the fender is prevented from accidental or wilful unwarranted manipulation when in its housed position. Moreover, the platform floor is left free and clear for conductor and passengers, when the motorman has housed the rear fender and has taken the pin 20 with him for the control of the front fender. To keep the wind from coming in through the slot in which said pin moves, I provide a plate 25, preferably formed of or covered with rubber, which is kept in yielding contact with the under surface of the floor by any suitable means, as guides 26. This plate is made with a hole just large enough to permit the pin to enter.

The fender itself comprises the side-rails 1 aforesaid; the two tubular rods 3 and 4, and the cradle slats 7 terminally held by said rods.

The guard consists of the curved slats 35 attached at their lower ends to said rod 4, and at their upper parts to the slender rod 36 whose ends 36' are bent downward and attached to the rod 4. The upper ends of the slats 35 are bent downward to form a cushion 37; a horizontal strip 38 serving to bind said ends together.

A further improvement is the resilient bar 30 located immediately in front of the edge of the fender but at a short distance therefrom; said bar being supported by the strap 33 at each end; said straps passing above and below the rod 3 and terminating rearwardly in the push-bars 32 slidably supported at their rear ends in the eyes 34. The ends 32 of these push-bars abut against the lower parts of the arms 15, and so partake of the resilience imparted thereto by the springs 24. Hence, when the bar 30 strikes the legs of a person who has suddenly run in front of the car, the blow will be thereby cushioned, and in addition the fender will be released from the locking arms 15 and permitted to drop. As the fender will reach the track far quicker than the person's body can fall to the ground, its front edge will be in place to run in beneath him and scoop him into the cradle 7. Hence, the fender is adapted for either dilemma, whether the man trips and falls into the cradle as soon as struck, or whether he falls in front of the fender.

The history of accidents shows that they occur either by the car striking a body lying on the track, or some one who has suddenly run or stepped in front of the car. With my fender, the motorman has nothing to do but to scuff his foot forward as he applies the brake, the instant he sees a body on the track ahead. As the fender drops instantly, it will reach the ground in ample time to slide in beneath such body and scoop it into the cradle. While for the person running or stepping suddenly in front of the car, this fender is ready either to receive him into its cradle, or to automatically drop to the ground and scoop him up.

It should be noted that it makes no difference whether the blow against the cushion-bar 30 is at either end or its center; the automatic drop is equally well performed, inasmuch as the shaft 23 causes the two arms 15 to swing rigidly together, so that a blow from a push-bar 32 against either, disengages the other also from its side-rail extension 2.

I prefer to form each trunnion 5 as a plug fixed within the ends of the tubular rod 4, as shown in Fig. 5. I also prefer to form each trunnion with shoulders 5' in order to keep the same from being forced longitudinally out from the slots 11 in the brackets 15. This plug arrangement also serves as a means for fastening the rod-ends to the side-rails 1, as shown in said figure.

I have found that the only way in which the fender can be released from the pivoted locking arms 15 by a backward swing given to the latter, is to form the under surface of the extension 2 which enters the notch 16 of such an arm upwardly oblique, and substantially concentric with the pivotal center 23 of such arm, while keeping the upper surfaces of said extensions parallel with the upper surface of the fender.

I have discovered that by having the slats 35 loosely held at their lower ends and of comparatively slight curvature, as shown in Fig. 2, they will be bent inward when struck a forcible blow, as by a body thrown against them when caught up by the fender, and will remain so until pressed forward again provided they are bent to a reverse curve by such blow,—that is, bent rearward far enough to be beyond a straight line joining their supporting rods 4 and 36. By having the slat-ends loose upon the lower bar or rod 4, the slats are not interfered with in thus receiving and retaining such reverse curve. This proves to be a most important function inasmuch as it prevents the rebound so fatal to other forms of fender cushions. In such other forms, when a person is thrown violently against them the rebound will impel him forward away from the fender, causing him excessive damage, and lessening the chances of his being saved from the wheels of the car.

A further most important advantage results from this reversing of the cushion slats, that is that when a body is thrown against the same and the slats collided with have been reversed, such body will be held from being thrown laterally from the fender, as well as forward as above described. This is caused by the unreversed cushion slats acting as supports at the sides of such body, and so insuring against its falling over laterally.

What I claim as my invention and for which I desire Letters Patent is as follows, to wit;—

1. The combination with a car fender having pivotal supports and extensions extending rigidly to the rear of said pivotal supports, of notched swinging arms engaging the extremities of said extensions; the notches in said arms being constructed to receive said extensions and to prevent both the same and the fender from being swung either up or down.

2. The combination with supporting brackets having pivot-notches, of a car fender having trunnions entering said notches, means for preventing said trunnions from rising upward out from said notches when the fender is in its normal position, rearward extensions rigid with the fender, and swinging arms engaging the ends of said extensions; such engagement being adapted to lock such extensions and hence the fender from swinging either up or down.

3. The combination with a car and brackets fixed thereto, said brackets having vertical open slots with curved edges concentric with the lower ends thereof, of a fender having trunnions resting in said slots, and blocks fixed to said fender beneath said curved edges.

4. The combination with supporting brackets, and a fender pivoted thereto to swing up into a vertical housed position, and having rearward extensions, of spring controlled arms pressing against said extensions to retain the fender in its housed position.

5. The combination with supporting brackets, and a fender pivoted thereto and having rearward extensions, of spring controlled notched arms constructed to engage said extensions to hold the fender in its normal position, and also to yieldingly retain the fender in its housed position.

6. The combination with suitable supports, of a fender pivoted to said supports, locking arms engaging said fender and holding it from falling to the track, a transverse rod forming the front of said fender, a cushion-bar parallel with said rod, straps attached to the ends of said cushion-bar and passing above and below said rod, and push-bars connected with said cushion-bar and extending rearward into engagement with said locking arms, whereby a rearward blow given to said cushion-bar releases said fender from its locking arms.

7. The combination with suitable supports, of a fender pivoted thereto having rearward extensions, spring-controlled rigidly united swinging arms engaging said extensions, and a cushion-bar located in front of the fender and having terminal push-bars ending immediately in front of said arms.

8. The combination with suitable supports, of a rock-shaft turning therein, locking means rigid with said shaft, a fender pivotally supported and normally held by said means from dropping, and a member projecting upward through the floor of the conveyance carrying such fender and connected with said shaft to enable the latter to be given a partial turn by a slight forward movement of the motorman's foot controlling such conveyance.

9. The combination with a car, of a fender pivotally supported thereby, locking devices for the fender, a member controlling the locking devices, and a projection removably held by the upper end of said member, said projection extended through the floor of the car platform.

10. The combination with a car, of a fender pivotally supported thereby, locking devices for said fender, an arm controlling said locking devices and having a socket in its upper end, and a pin removably held in said socket.

11. The combination with a car having a slot in its platform, of a fender pivotally supported by the car, locking devices for the fender, means controlling the locking devices projecting upward through said slot, and a plate slidably supported beneath said slot to close it against an upward rush of air and movable with the said controlling means.

12. The combination with a car having a slot in its platform, of a fender pivotally supported by the car, locking devices for the fender, an arm controlling said devices, a pin rising from said arm through said slot, and a slidable plate penetrated by said pin but otherwise closing said slot.

13. The combination with a suitable support, of a fender pivoted thereto and having a rearward extension, and a locking arm formed with a notch engaging said extension; the upper surface of the part of said extension entering said notch being parallel with the upper surface of the fender, but the under surface of which is beveled upward.

14. The combination with a suitable support, of a fender pivoted thereto and having a rearward extension for each side thereof and locking arms pivoted above said extensions each having a notch engaging one of said extensions, the upper surfaces of the extensions entering said notches being parallel with the upper surface of the fender, and their under surfaces being beveled upward.

15. A car fender pivotally supported near its rear edge and formed with a cradle very deep at its rear portion and shallow in front, whereby when the fender is dropped to the track the object caught up therein will remain in such deeper rearward part.

16. A car fender composed of side-rails, tubular rods joining the rear and front of said rails, trunnion-plugs located in the ends of the rear rod and securing the same to said rails, and supports for said trunnions.

17. The combination with supporting brackets, of a rock-shaft turning therein, locking arms rigid with said rock-shaft, means whereby said shaft can be operated from the platform of the car from which said brackets depend, and a fender pivotally supported by said brackets and normally held by said arms.

18. The combination with a car fender, of a cushion guard therefor consisting of curved slats pivotally supported at their ends and disposed to be bent inward into a reverse curve when forcibly struck and so to remain until returned to their normal positions.

In testimony that I claim the foregoing invention, I have hereunto set my hand this 15th day of November, 1904.

LOWELL MASON MAXHAM.

Witnesses:
 A. B. UPHAM,
 FRED G. TILTON.